United States Patent [19]
Ito et al.

[11] Patent Number: 5,288,984
[45] Date of Patent: Feb. 22, 1994

[54] HANDY TYPE BAR CODE READER WITH A PROTECTIVE COMPONENT HOLDER

[75] Inventors: Toshifumi Ito, Yaomi; Takeshi Matsushima, Nagoya, both of Japan

[73] Assignee: Nippondenso Co., Ltd., Kariya, Japan

[21] Appl. No.: 796,670

[22] Filed: Nov. 25, 1991

[30] Foreign Application Priority Data

Nov. 27, 1990 [JP] Japan ................................ 2-327057

[51] Int. Cl.⁵ ............................................. G06K 7/10
[52] U.S. Cl. ..................................... 235/472; 235/462
[58] Field of Search ................ 250/568; 235/454, 462, 235/463, 472

[56] References Cited

U.S. PATENT DOCUMENTS

| | | | |
|---|---|---|---|
| 4,408,120 | 10/1983 | Hara et al. | 235/462 |
| 4,900,907 | 2/1990 | Matusima et al. | 235/472 |
| 5,184,005 | 2/1993 | Ukai et al. | 235/463 |

FOREIGN PATENT DOCUMENTS

| | | |
|---|---|---|
| 0221545 | 5/1987 | European Pat. Off. |
| 0238067 | 9/1987 | European Pat. Off. |
| 2181585 | 4/1987 | United Kingdom |

*Primary Examiner*—David C. Nelms
*Assistant Examiner*—Stephone Allen
*Attorney, Agent, or Firm*—Cushman, Darby & Cushman

[57] ABSTRACT

A handy type bar code reader for reading bar codes, including within a body case an LED base for radiating light used for reading bar codes; a condenser lens for condensing the light radiated from the LED base and conducting the condensed light to the bar codes; a focusing optical system for focusing a bar code image based on the light reflected from the bar codes in a predetermined read position, the focusing optical system comprising a reflecting mirror and a focusing lens; and an image sensor for reading the focused bar code image. The LED base and a condenser lens are held within the body case in a non-fixed state with respect to the body case.

15 Claims, 5 Drawing Sheets

5,288,984

HANDY TYPE BAR CODE READER WITH A PROTECTIVE COMPONENT HOLDER

BACKGROUND OF THE INVENTION

The present invention relates to a handy type bar code reader comprising light radiating means for radiating light used for reading bar codes, a condenser lens for condensing the radiated light and conducting condensed light to bar codes, optical means for focusing a reflected light from the bar codes as an image in a predetermined read position, and read means for reading information from the focused image, all of the means and condenser lens being disposed within a body case in a predetermined relation of arrangement.

In a conventional handy type bar code reader, as shown in FIG. 5, an LED base A for the radiation of light and a condenser lens B are fixed rigidly to a body case F in proximity to a light radiation window E using a mounting steel stay C and machine screws D.

The body case F, usually formed of ABS resin or the like, is sometimes distorted physically under an external impart applied thereto upon dropping for example. In the event of such dropping, since a cable is present on the grip portion side, the light radiation window E side strikes against the floor in many cases. Moreover, while the handy type bar code reader is in use, the light radiation window E or the vicinity thereof is struck against a commodity or a work table in many cases. The light radiation window E and the vicinity thereof are not very rigid or sturdy because a large space for receiving reflected light from a bar code label is formed therein.

Therefore, the light radiation window E and the vicinity thereof in the body case F are sometimes distorted under impact caused by such dropping or striking. This distortion directly acts on the mounting stay C which is in a rigid relation to the body case F. This in turn causes deformation of the stay, and also acts as a direct deforming force on the LED base A and the condenser lens B which are in a rigid relation to the mounting stay C, thus causing damage of the base and the lens such as disengagement, bending or cracking. As a result, there arises such a problem as the deterioration of the reading performance or the impossibility of reading.

SUMMARY OF THE INVENTION

It is the object of the present invention to provide a handy type bar code reader capable of diminishing the influence of dropping or the like on the light radiating means (LED base) and the condenser lens even in the event of the foregoing dropping or the like of the body case and thereby preventing the deterioration of the reading performance.

In order to achieve the above-mentioned object, the present invention is characterized in that the light radiating means and the condenser lens are held in a non-fixed state within the body case.

DETAILED DESCRIPTION OF THE PREFERRED EMBODIMENT

Figure 1:
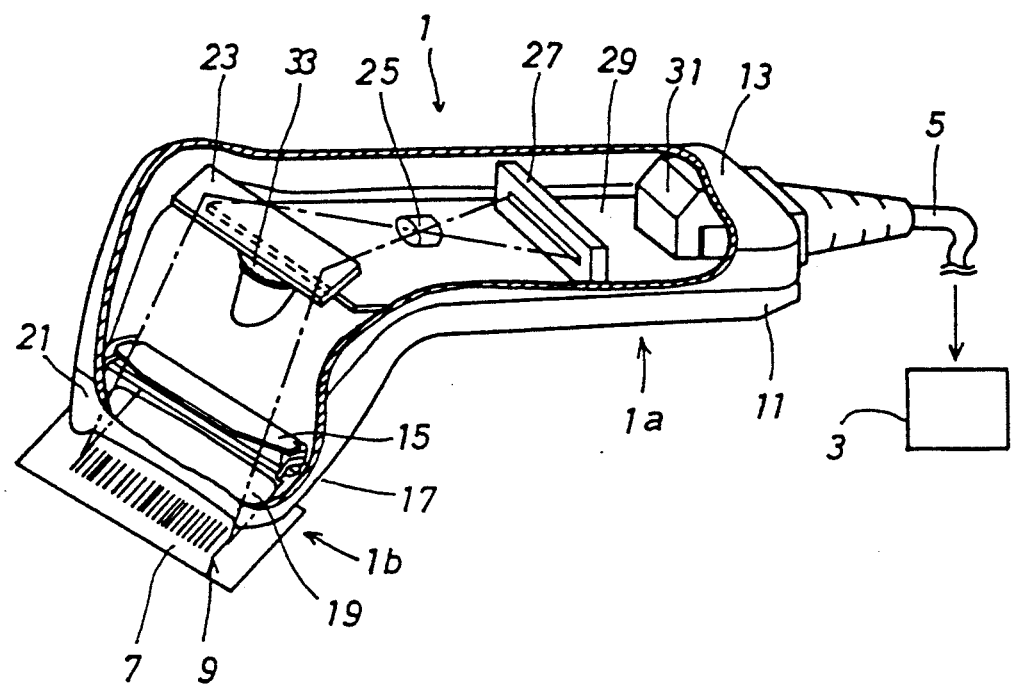
FIG. 1 is a partially cut-away perspective view of a bar code reader according to an embodiment of the present invention.

FIG. 1 is a perspective view broken away partially so that an internal construction of a handy type bar code reader 1 embodying the invention can be understood.

The bar code reader 1 is connected to a host computer 3 through a cable 3. The user grips a part 1a formed with a predetermined length on the cable 5 side. A light radiation window 1b formed in a front end of the bar code reader which end is bent downwards in the figure on the side opposite to the cable 5 and brought into a face-to-face relation to a bar code label 7 to radiate light to the same label. Subsequently, bar codes 9 printed on the bar code label 7 are read from the light reflected from the same label, and the result of the reading is transmitted to the host computer 3.

The bar code reader 1 is formed in a bent shape having the grip part 1a and the light radiating window 1b at the front end by fitting and assembling vertically-divided body cases 11 and 13 made of ABS resin together. In positions near the light radiation window 1b in the thus-assembled body cases 11 and 13 there are disposed an LED base 15 for radiating light of red color to the bar code label 7 and condenser lens 17 for condensing light from the LED base 15 and conducting it onto the bar code label 7. Ahead of the LED base 15 and the condenser lens 17 is disposed a dust-proof plate 19 made of a transparent acrylic resin to attain a substantially hermetically sealed structure in cooperation with the body cases 11 and 13. The portion of the light radiation window 1b is covered with a buffer cover 21 to buffer a striking impact against a commodity or the like at the time of bar code reading operation.

Reflection light of the light which has been radiated to the bar code label 7 by the LED base 15 and the condenser lens 17 enters the body cases 11 and 13 through the dust-proof plate 19. In the bent portion within the body cases 11 and 13 there is disposed a plane reflector mirror 23 for reflecting the reflected light toward the grip part 1a. On the grip part 1a side there are disposed a focusing lens 25 for focusing the reflected light from the plane reflector mirror 23 in a predetermined position as an image of the bar codes 9, and an image sensor 27 for converting the image of the bar codes 9 into an electric signal in the focused position. The image sensor 27 is of a one-dimensional type comprising a large number of photo elements arranged linearly.

Within the grip part 1a of the body cases 11 and 13 after assembly there are disposed a printed circuit board 29 having a drive circuit for the LED base 15, a signal processing circuit for binarizing the electric signal fed from the image sensor 27 and a communication circuit for connection with the host computer 3, and a female connector 31 of a modular type box shape for fitting and connecting together the printed circuit board 29 and the cable 5 extending from the host computer 3.

The printed circuit board 29 is further provided with an alarm circuit for informing the user of the end of reading operation, the occurrence of an error, etc., whereby a piezoelectric buzzer 33 disposed within the body cases 11 and 13 is also driven.

Next, a mounting structure for the LED base 15 and the condenser lens 17, which is a characteristic structure of this embodiment, will be described below with reference to FIGS. 2 to 4.

Figure 2:
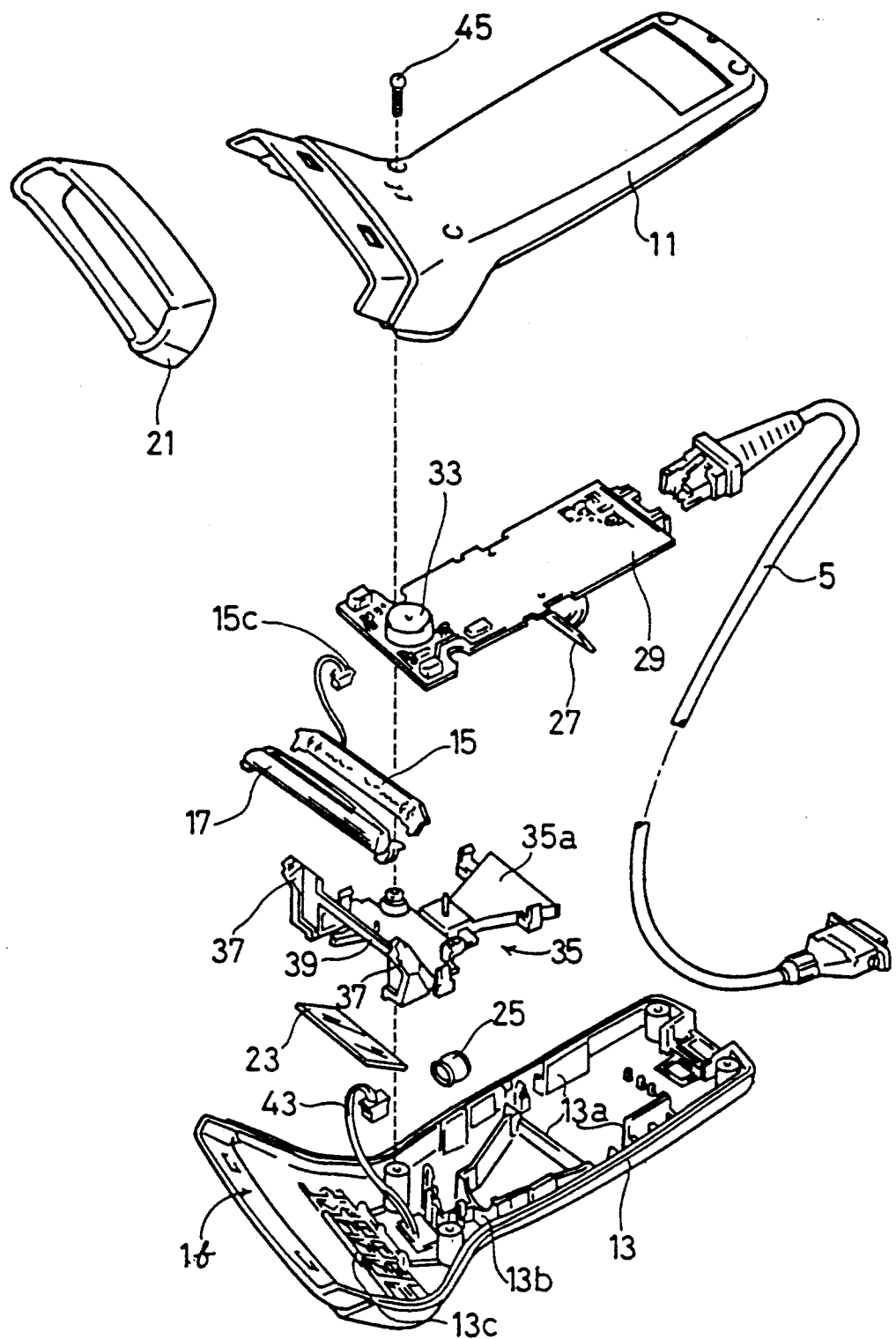
FIG. 2 is an exploded perspective view of the bar code reader of the embodiment of FIG. 1.
Figure 3:
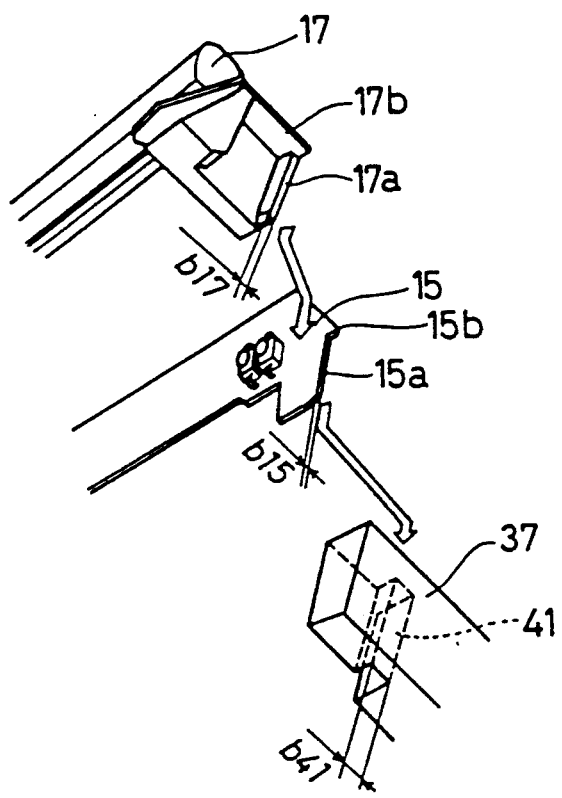
FIG. 3 is a perspective view of a principal portion, showing how the LED base and a condenser lens are mounted according to the present invention.

The body case (hereinafter referred to also as the "upper case") 13 positioned on an upper side in FIG. 1 is provided with a number of ribs 13a at the portion thereof which defines the grip part 1a, as shown in FIG. 2. The ribs 13a are for supporting various mounting parts in predetermined positions, and at the same time they impart rigidity to the grip part 1a. The other body case (hereinafter referred to as the "lower case") 11 is also provided with ribs for the same purpose, though not shown.

In assembly, first the upper case 13 is placed with the inside thereof facing up, and the plane reflector mirror 23 and the focusing lens 25 are supported by respective receptacles 13b and 13c formed in a predetermined positional relation. Next, a body 35 made of ABS resin is mounted from above to hold the plate reflector mirror 23 and the focusing lens 25 between it and the upper case 13.

The body 35 is provided with a body portion 35a for holding the plane reflector mirror 23 and the focusing lens 25 between it and the upper case, and two arms 37, 37 extending from the body portion 35a leftwards in the figure up to a position near the light radiation window 1b.

Both arms 37, 37 are interconnected through a connecting member 39 so as to be spaced a predetermined distance from each other and have a sufficient flexural rigidity per se. Further, as shown in FIG. 3, front ends of the arms 37 are each formed with a single slot 41 on the sides opposed to each other. The slots 41 are for fitting slide edges 15a and 17a formed at transverse end of the LED base 15 and the condenser lens 17 into the body by sliding motion. The width, indicated at b41, of each slot 41 is set approximately equal to the sum of widths b15 and b17 of the slide edges 15a and 17a, and the slot is formed with an accuracy permitting the positioning of both LED base 15 and condenser lens 17.

The LED base 15 and the condenser lens 17 fitted into the slots 41 are stopped in a position of a predetermined depth in the slots 41 by stopper edges 15b and 17b formed at upper ends shown in the figure of the slide edges 15a and 17a. The LED base 15 and the condenser lens 17 are slidably held in such a manner as shown in FIG. 3 by the arms 37 of the body 35 thus constructed. Then, as shown in FIG. 2, the printed circuit board 29 with the image sensor 27 and the piezoelectric buzzer 33 mounted thereto is put over the body 35 from above, then a connector 15c of the LED base 15 and a connector 43 of a display LED embedded in the upper case 13 are connected to the printed circuit board 29, further, the lower case 11 is put over the board 29, and the lower case 11, body 35 and upper case 13 are fixed together with machine screws 45. At the same time, the dustproof plate 19 is sandwiched between the upper case 13 and the lower case 11. Thereafter, the buffer cover 21 is mounted, followed by connection of the cable 5, whereby the assembly of the bar code reader 1 is completed.

Figure 4:
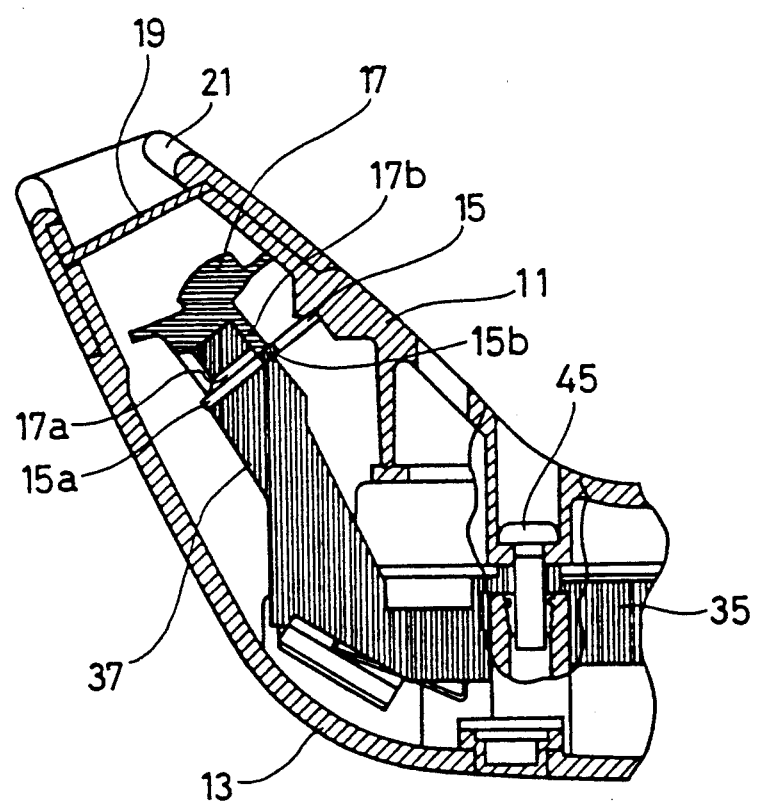
FIG. 4 is a sectional view of a principal portion after assembly in a cut state along a slot portion formed in each arm of a body according to the present invention.
Figure 5:
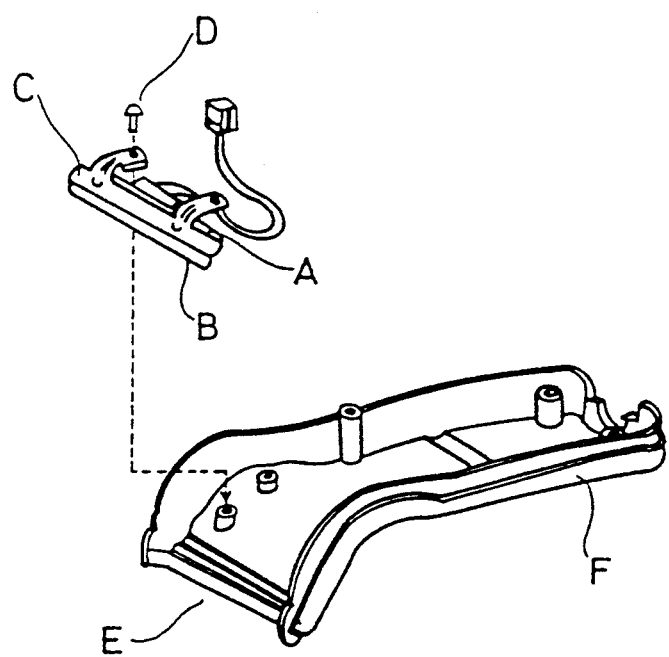
FIG. 5 is an exploded perspective view showing an assembled state of some parts of a conventional bar code reader.

The LED base 15 and the condenser lens 17 after the assembly are in such a relation to the body cases 11 and 13 as shown in FIG. 4. The LED base 15 and the condenser lens 17 are held by the slots 41 in a positional relation such that both are spaced a predetermined distance from each other. By the action of the stopper edges 15b and 17b, the LED base 15 and the condenser lens 17 are held in a completely floating state from the upper case 13 and are brought into abutment with the lower case 11 without causing a large wobbling motion. In other words, the stopper edges 15b and 17b are so constructed to permit the LED base 15 and the condenser lens 17 to be held by the arms 37 of the body 35 in a predetermined positional relation to the body cases 11 and 13.

According to the bar code reader 1 of this embodiment, since it is constructed as above, an accurate assembly can be attained by the positioning function of the body 35 and that of the ribs 13a in such a manner that a positional relation between the LED base 15 and the condenser lens 17 and a positional relation among the plane reflector mirror 23, focusing lens 25 and image sensor 27 satisfy predetermined optical conditions. Consequently, the reading of the bar codes 9 printed on the bar code label 7, which is an inherent function of the bar code reader 1, can be executed accurately.

Since the LED base 15 and the condenser lens 17 are mounted in a free, not rigid, relation to the body cases 11 and 13, even when the vicinity of the light radiation window 1b is distorted by a dropping impact or the like, the LED base and the condenser lens can escape such distortion and maintain the original positional relation between the two. In addition, there is no longer any possibility of both being cracked by such distortion. Therefore, even in the event of dropping of the bar code reader 1, there will be neither deterioration of the reading performance nor the impossibility of reading.

One reason for this is as follows. In the body 35, its body portion 35a is sandwiched between the body cases 11 and 13 on the grip part 1a side and fixed rigidly, but the arms 37 are extended up to the vicinity of the light radiation window 1b in a floating state from the body cases 11 and 13. The LED base 15 and the condenser lens 17 are held in this state, and it is no longer required to fix the parts 15 and 17 directly or substantially directly to the body cases 11 and 13. This can be easily understood from the fact that even when the LED base 15 and the condenser lens 17 are fixed rigidly to the arms 37 with bolts for example, as the most extreme construction, there also can be obtained the effect based on a non-fixed support thereof for the body cases 11 and 13. It is also possible to construct the bar code reader so that the parts 15 and 17 thus fixed with bolts are not in contact at all with the body cases 11 and 13. According to such a construction the foregoing object of the invention is easily accomplished.

Another reason for such object being accomplished is as follows. The LED base 15 and the condenser lens 17 are held free in the thickness direction of the body cases 11 and 13 by the slots 41 which receive therein the LED base and the condenser lens through sliding motions from the thickness direction of the body cases. The resulting function and effect will now be explained in more detail. In FIG. 4, the LED base 15 and the condenser lens 17 in abutment with the lower case 11, but in a non-fixed state, so even when the lower case is distorted by an impact for example, they can escape from it and hence can be prevented from being damaged.

Even if an impact force is exerted in a direction orthogonal to the thickness direction of the body cases 11 and 13, the body cases will not be distorted because their flexural rigidity in an assembled state is high. Thus, such impact force causes no problem.

Since this embodiment includes the construction capable of attaining such two excellent functions and effects, the assembling operation can be done much more easily than in the conventional method using a steel stay and there can be attained an accurate positioning in the mounting operation, as has been explained above in connection with FIG. 2.

Further, since the body 35 holds the printed circuit board 29 with the image sensor 27 attached thereto as well as the focusing lens 25 and the plane reflector mirror 23 in cooperation with the body case 13, it as a single part functions to maintain the positional relation of the optical system from the LED base 15 up to the image sensor 27. Therefore, even when the shapes of the body cases 11 and 13 are changed in design, this will not cause a relative positional relation of the optical parts 15 and 17, and thus the versatility in design is enhanced.

Although an embodiment of the present invention has been described above, it goes without saying that the invention is not limited thereto and that various modifications may be made within the scope not departing from the gist of the invention.

We claim:

1. A handing type bar code reader for reading bar codes, comprising:
   light radiating means for radiating light used for reading bar codes;
   condenser lens means for condensing the light radiated by said light radiating means and directing the condensed light to the bar codes;
   optical means for focusing a bar code image reflected from the bar codes at a predetermined read position;
   reading means for reading the focused bar code image;
   a body case for carrying said light radiating means, said condenser lens means, said optical means and said reading means in a predetermined relation of arrangement; and
   holding means for holding said light radiating means and said condenser lens means in a moveable relation with respect to said body case.

2. A handy type bar code reader according to claim 1, wherein said holding means has a portion fixed to said body case and an arm extending form said fixed portion and suspended within said body case, said light radiating means and said condenser lens means being held by said arm.

3. A handy type bar code reader according to claim 2, wherein said body case comprises a grip portion and a front end portion, said front end portion having a light radiation window adapted to face the bar codes, said holding means is fixed to said body case at said grip portion, and said arm extends from said fixed portion up to a position near said light radiation window.

4. A handy type bar code reader according to claim 3, wherein said body case is divided into first and second case portions, said holding means, said optical means and said reading means being mounted to said first case portion.

5. A handy type bar code reader according to claim 4, further comprising a printed circuit board to which said reading means is attached and which is mounted on said first case portion together with said holding means.

6. A handy type bar code reader according to claim 1, wherein said holding means is a holder member having a slot for holding said light radiating means and said condenser lens means in sliding relation therein, said light radiating means and said condenser means being held in non-fixed abutment with the body case.

7. A handy type bar code reader according to claim 6, wherein said slot is formed in a thickness direction of said body case.

8. A handy type bar code reader according to claim 1, wherein said light radiating means includes an LED base.

9. A handy type bar code reader for reading bar codes, comprising:
   light radiating means for radiating light used for reading bar codes;
   condenser lens means for condensing the light radiated by said light radiating means and directing the condensed light to the bar codes;
   optical means for focusing a bar code image reflected from the bar codes at a predetermined read position;
   reading means for reading the focused bar code image;
   a body case for carrying said light radiating means, said condenser lens means, said optical means and said reading means in a predetermined relation of arrangement, said body case comprising a grip portion and a front end portion, said front end portion having a light radiation window adapted to be positioned in facing relation to the bar codes; and
   holding means, fixed to the grip portion side of said body case and having an arm extending in suspension within said body case from said grip portion to a position near said light radiation window, for holding said light radiating means and said condenser lens means in a predetermined positional relation with respect to one another and in a moveable relation with respect to the body case.

10. A handy type bar code reader for reading bar codes, comprising:
    light radiating means for radiating light used for reading bar codes;
    condenser lens means for condensing the light radiated by said light radiating means and conducting the condensed light to the bar codes;
    optical means for focusing a bar code image reflected from the bar codes at a predetermined read position;
    reading means for reading the focused bar code image;
    a body case for holding therein said light radiating means, said condenser lens means, said optical means and said reading means in a predetermined relation of arrangement; and
    holding means, disposed within said body case and having a slot formed in a thickness direction of the body case, for slidably holding said light radiating means and said condenser lens means in said slot so that the light radiating means and the condenser lens means are held in non-fixed abutment with the body case.

11. A handy type bar code reader according to claim 10, wherein said holding means has a portion fixed to said body case and an arm extending from said fixed portion so as to be suspended within said body case, said light radiating means and said condenser lens means being held by said arm.

12. A handy type bar code reader according to claim 11, wherein said body case comprises a grip portion and a front end portion, said front end portion having a light radiation window adapted to face the bar codes, said holding means being fixed to said body case at said grip portion, and said arm extending from said fixed portion up to a position near said light radiation window.

13. A handy type bar code reader according to claim 12, wherein said body case is divided into first and second case portions, said holding means, said optical means and said reading means being mounted on said first case portion.

14. A handy type bar code reader according to claim 13, further comprising a printed circuit board to which said reading means is attached and which is mounted on said first case portion together with said holding means.

15. A handy type bar code reader according to claim 10, wherein said light radiating means includes an LED base.

* * * * *